United States Patent [19]

Arney et al.

[11] 4,078,182

[45] Mar. 7, 1978

[54] DESTRUCTIVE MECHANISM FOR AUTOMOBILE TAPE DECKS, RADIOS AND THE LIKE

[76] Inventors: Donald B. Arney, 12287 Fulton St., Maple Ridge, British Columbia; Jon L. S. Buckle, 2245 Kedge Anchor Road, R.R. 1, Sydney, British Columbia, both of Canada

[21] Appl. No.: 700,204

[22] Filed: Jun. 28, 1976

[30] Foreign Application Priority Data

Jul. 11, 1975 United Kingdom ............... 29186/75

[51] Int. Cl.[2] ............................................ H02G 3/00

[52] U.S. Cl. ............................................ 307/10 AT

[58] Field of Search ........................ 307/10 AT, 10 R; 340/64; 180/114

[56] References Cited

U.S. PATENT DOCUMENTS 3,160,761 12/1964 Fuller ............................ 307/10 AT

*Primary Examiner*—Herman J. Hohauser

*Attorney, Agent, or Firm*—Carver and Company

[57] ABSTRACT

A destructive device for automobile radio equipment in which the radio equipment and an over-load power source connected in circuit to the radio equipment are enclosed in an open-front box closable by a removable face plate normally locked over the box by a key-operated lock, the circuit having two switches in series, one of them being actuated to a closed position when the face plate is removed and the other being normally closed when the lock is closed and opened when the lock is opened so that the circuit is closed to destroy the radio equipment when an attempt is made to remove the face plate without first operating the lock to an open position.

5 Claims, 5 Drawing Figures

DESTRUCTIVE MECHANISM FOR AUTOMOBILE TAPE DECKS, RADIOS AND THE LIKE

BACKGROUND OF THE INVENTION

Field of the Invention

This invention relates to anti-theft devices and in particular to anti-theft devices for the prevention of theft of electrical equipment such as radios, tape decks, and the like, from automobiles.

Prior Art

It has generally been the practice to design anti-theft devices which operate only to detect and indicate unauthorized entry, or the like, that is effected or attempted. Indicators normally used are lights and sound generating equipment, such as sirens.

Anti-theft devices of this nature are not suitable for inhibiting or preventing theft of small electrical equipment, such as radios, tape decks, and the like, from automobiles as the power source for operating indicators such as lights or sirens must be the automobile battery which can, of course, be easily disconnected and the radio or tape deck equipment then removed without energizing the indicating devices.

SUMMARY OF THE INVENTION

The present invention provides an anti-theft device for electrical equipment, such as tape decks and radios, for automobiles which results in destruction of circuitry of the equipment when unauthorized removal of the equipment is attempted, and which has its own untamperable power source which cannot be disassociated from the equipment without the operation of a key.

The present invention includes a casing adapted to be fastened to the automobile in which the chasis of the electrical equipment which is to be protected is fastened, the casing having a heavy metal removable face plate through which equipment controls project. A battery-operated over-load power source mounted in the casing and connected in circuit to the equipment circuitry, a first normally closed switch in the over-load power circuit adapted to be open when the face plate is applied to the casing, a securing nut adapted to be threaded on a threaded sleeve of an equipment control member adapted to be tightened against the face plate for maintaining the first switch in the closed position, key-operated locking means mounted in the casing operable to a locking position to lock the nut against rotation and operable to a release position to release the nut for rotation, and a second normally open switch mounted in the casing connected in series with the first switch adapted to be closed by the locking means when the latter is operated to the locking position.

A detailed description following, related to the drawings, gives exemplification of apparatus according to the invention which, however, is capable of expression in means other than those particularly described and illustrated.

DETAILED DESCRIPTION

Figure 1:
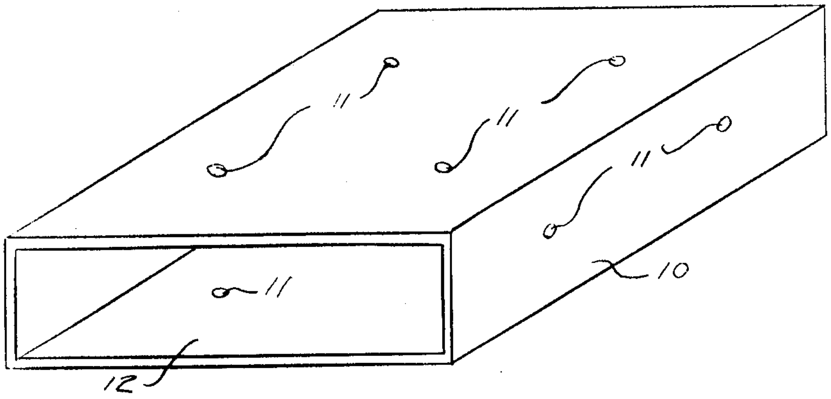
FIG. 1 is an isometric view of a casing for receiving electrical equipment to be protected.

Referring to the drawings, the anti-theft device adapted to be mounted in an under-dashboard location in an automobile includes a heavy metal casing 10 (see FIG. 1) which has holes 11 by means of which the casing can be secured to a vehicle, roundheaded bolts (not shown) being used and disposed with the round heads outwards so as to make removal of the casing from the vehicle difficult. The casing is open at its front end 12 to receive the chasis 13 (see FIG. 3) of the electrical equipment, the equipment chasis also being secured inside the casing by brackets secured by roundheaded bolts 13.1 (see FIG. 2) in which the round heads of the bolts are disposed externally of the casing.

A heavy metal face plate 14 fits over the front end 12 of the casing and has openings suitably positioned for enabling the equipment controls, generally 16, to project therethrough. The face plate has apertures 17 for enabling access to nuts 18 applied to the bolts 13.1.

Figure 2:
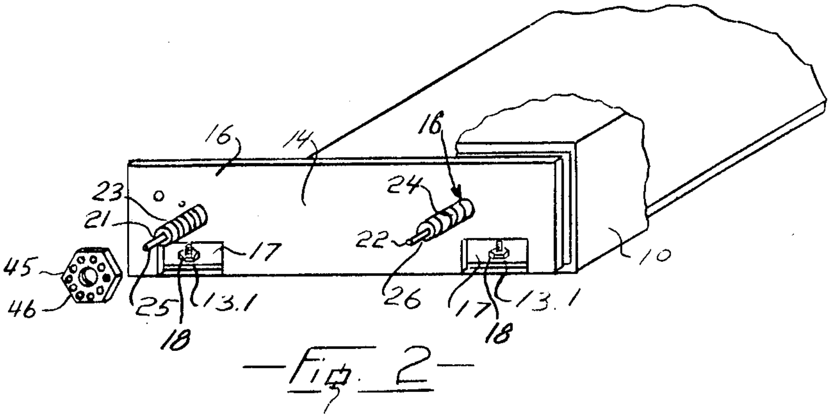
FIG. 2 is an isometric view, partially exploded, of a portion of the device showing location of equipment controls and anti-theft components.
Figure 3:
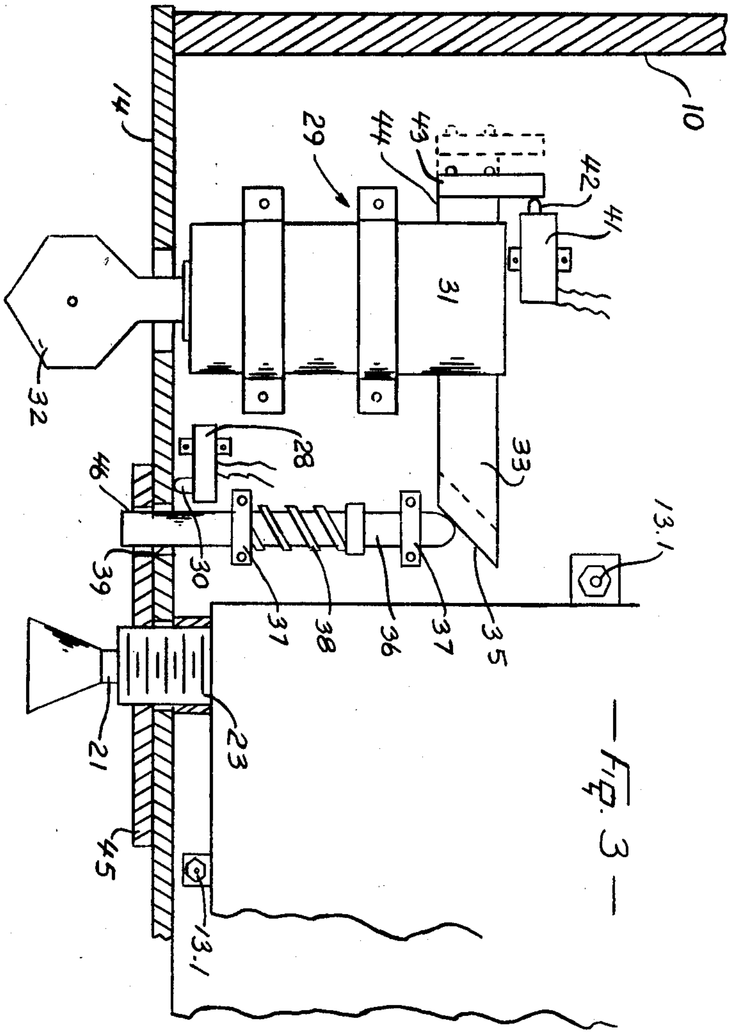
FIG. 3 is a sectional plan view showing a portion of the anti-theft device, particularly the arrangement of spring-loaded switch and locking pin.

Referring to FIGS. 2 and 3, the electrical equipment, which in this case is a radio, has volume and tuning controls 21 and 22 which project from the equipment chasis. The controls 21 and 22 are similar in construction and have threaded sleeves 23 and 24, respectively, through which rotatable operating shafts 25 and 26, respectively, extend. The chasis of the equipment is so mounted in the casing that the sleeves project through suitable openings in the face plate 14.

As shown, portions of the anti-theft device are arranged at volume control 21 and include a normally closed electrical activating switch 28 and a key-operated electrical switch and locking assembly, generally 29. The switch 28 which is secured to the casing has a spring-loaded plunger actuator 30 which normally extends out of the open end of the casing.

The switch and locking assembly 29 have a lock body 31, suitably a dead bolt type lock, secured in the casing, operated by a removable key 32, which operates a transversely movable locking bolt 33 between extended and retracted positions. One end 34 of the bolt is bevelled to provide a camming face 35 which is in camming engagement with a locking pin 36. The pin 36 is mounted in the casing for slidable movement within brackets 37 and is spring-urged to a normal retracted position within the casing by a compression spring 38. The pin is so located that when the bolt is extended by the operation of the key, the camming face 35 of the bolt moves the pin to an extended position in which is projects through a suitable opening 39 in the face plate. A normally open electrical switch 41 having a spring-operated plunger 42 is mounted in the casing with the plunger 42 confronting an arm 43 secured to the opposite end 44 of the bolt. The arm engages and depresses the plunger 42 when the bolt is moved from its retracted to an extended position to close the switch 41.

The sleeve 23 has a nut 45 fitted thereon which can be tightened against the face plate to press the face plate firmly against the casing which thus depresses the plunger actuator 31 and opens the switch 28. The nut has a plurality of concentrically disposed openings 46 any one of which can be moved into register with the opening 39 of the face plate to slidably receive the locking pin 36 when the latter is moved to its extended position.

It is seen that with the electrical equipment installed and with the nut 45 secured against the face plate, the nut 45 cannot be backed off the sleeve 23 to enable the face plate to be removed without permitting extension of the plunger 30 and closure of the switch 28. Furthermore, with the switch 41 in its closed position, engagement of the locking pin 36 with the nut prevents rotation of the nut. The nut cannot be removed, therefore, without first using the key 32 to operate the switch 41 to the open position which at the same time withdraws the locking pin from its engagement with the nut.

Figure 4:
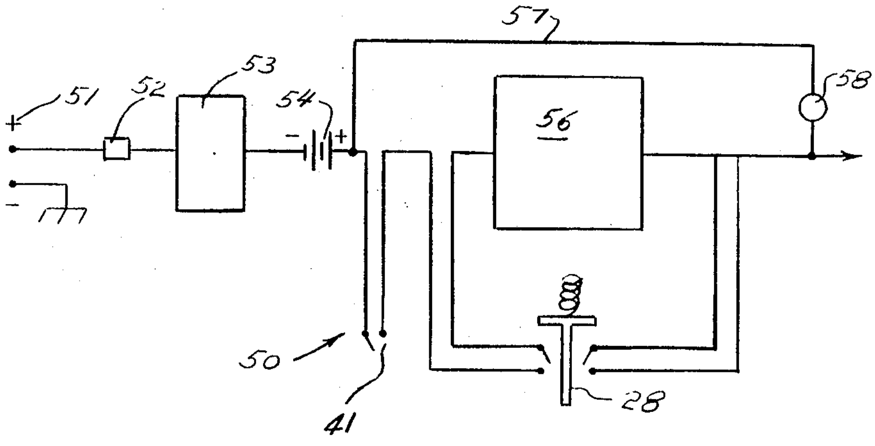
FIG. 4 is a block diagram showing, schematically, one arrangement of destruction system.

FIG. 4 shows one form of the destruction system, generally 50, which is connected to the circuitry of the electrical equipment to destroy the equipment by introduction of higher-than-normal voltage. The system 50, which is connected to the automobile battery 51 is mounted in the casing so as to prevent unauthorized access thereto and includes a fuse 52 and charging regulator 53 connected to a battery 54, of the type that can be charged through the charging regulator. The switches 28 and 41 are connected in series in circuit between the battery 54 and the electrical equipment. The switch 28 is also connected in circuit with an inverter 56 which increases battery output voltage to a value sufficient to result in destruction of equipment components. For example, inversion of battery output of 12 volts D.C. to 250 volts A.C. is considered acceptable. Normal operating current flows from the battery to the equipment circuit is provided by a bypass 57 through a fuse 58.

With either switch 28 or 41 open, the electrical equipment receives 12 volts D.C. With both switches closed the circuitry of the equipment is subject to destructive voltage provided by the inverter.

In installing or repairing the equipment, the switch 41 is first opened by suitable operation of the key, thus dis-associating the destruct circuitry from the battery 54. Operation of the switch 41 to its open position also withdraws the locking pin from the nut 45 so as to enable the nut to be backed off to enable the equipment chasis to be removed from the casing. Under normal conditions, the switch 41 is closed by suitable operation of the key, and the key then removed so that any tampering with the nut 45 will result in closure of the switch 28 with, consequent, destruction of the electrical equipment. The provision of the locking pin prevents accidental destruction of the electrical equipment if a service man, or the like, should attempt to back off the nut to remove the face plate.

Figure 5:
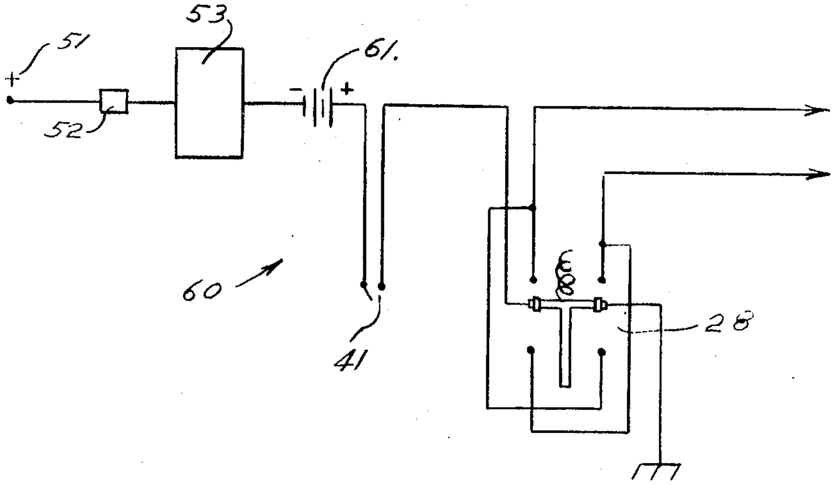
FIG. 5 is a block diagram showing another arrangement of destruction system.

FIG. 5 shows, schematically, another destruct system 60 wherein polarity reversal is employed to obtain a destructive effect. System 60 is somewhat the same as system 50 using a chargable battery 61 which is connected through switches 28 and 41 to the electrical equipment. In system 60, however, the chasis is not grounded as grounding would result in a direct short to the chasis when polarity is reversed.

The circuitry of system 60 showing operation of the polarity reversal switch is self-explanatory. In system 60 closure of the switch 28 simply reverses polarity to effect destruction of equipment circuitry.

Although in the foregoing description, reference has been made to the installation of anti-theft device as an under-dashboard installation, it is evident that the device can be used with a behind-dashboard installation. In the behind-dashborad installation the face plate can be omitted as the dashboard acts as the face plate, suitable openings being provided in the dashboard for permitting movement of the locking pin between extended and retracted position and to provide access to the lock for key operation. It is to be understood therefore, that the claims, in respect of the face plate, shall be read accordingly.

We claim:

1. A destructive device for radio equipment for automobiles and the like, which radio equipment has at least one threaded sleeve through which a radio equipment control member extends, the device comprising:

(a) a casing open at one end adapted to be secured inside the vehicle, (b) means for securing the radio equipment in the casing with the threaded sleeve projecting out of the open end thereof, (c) a removable face plate covering the open end of the casing and having an opening through which the threaded sleeve projects, and having a hole adjacent said threaded sleeve, (d) a nut threadedly engaging the sleeve adapted to be tightened against the face plate for securing the face plate against the open end of the casing, (e) an over-load power source mounted in the casing and connected in an over-load circuit with the equipment circuitry, (f) a first normally closed contact switch in the over-load circuit mounted in the casing positioned so as to be operated to an open position by contact with the face plate when the latter is applied to the open end of the casing, (g) a detent slidably mounted in the casing confronting the hole therein for movement through the hole into and out of locking engagement with the nut, (h) a spring urging the detent to a normal unlocked position, (i) key-operated locking means for moving the detent against the action of the spring into locking engagement with the nut, and a (j) normally open switch mounted in the casing and connected in the over-load power circuit in series with the first mentioned electrical switch adapted to be closed by the locking means when the latter is operated to move the detent into locking engagement with the nut.

2. A destructive device as claimed in claim 1 in which the detent is a pin and in which the locking nut has a plurality of holes adapted, selectively, to be moved into registry with the hole in the face plate for slidably receiving the pin.

3. A destructive device as claimed in claim 1 in which the locking means includes a bolt reciprocally operated by operation of the key and having a camming face at one end for camming engagement with the detent so as to move the detent into locking engagement with the nut.

4. A destructive device as claimed in claim 1 in which the over-load power source includes a chargeable battery and an inverter connected to the battery to increase out-put voltage of the battery to a value sufficient to result in destruction of the radio equipment.

5. A destructive device as claimed in claim 1 in which the over-load power source includes a chargeable battery and inverter for increasing the battery output voltage to a value sufficient to result in destruction of equipment components and in which the first-mentioned electrical switch when closed provides polarity reversal so as to result in destruction of equipment circuitry.

* * * * *